United States Patent [19]
Thrower et al.

[11] 3,724,623
[45] Apr. 3, 1973

[54] SEGMENTED FRICTION MEMBER ASSEMBLY FOR BRAKE OR CLUTCH

[75] Inventors: Arthur J. Thrower; Marvin E. Hotchkiss, both of Troy, Ohio

[73] Assignee: The B. F. Goodrich Company, New York, N.Y.

[22] Filed: Sept. 30, 1971

[21] Appl. No.: 185,238

[52] U.S. Cl..........................192/107 R, 188/218 XL
[51] Int. Cl. .........................F16d 65/12, F16d 13/64
[58] Field of Search.....................192/107 R, 218 XL

[56] References Cited

UNITED STATES PATENTS

| | | | |
|---|---|---|---|
| 3,403,759 | 10/1968 | Holcomb | 192/107 R |
| 3,618,729 | 11/1971 | Ely | 192/107 R |
| 3,295,641 | 1/1967 | Eaton et al. | 188/218 XL |
| 3,483,953 | 12/1969 | Bender | 192/107 R |
| 3,599,766 | 8/1971 | Ely | 192/107 R |

Primary Examiner—Benjamin W. Wyche
Attorney—John D. Haney

[57] ABSTRACT

A segmented friction member assembly for a disc type brake or clutch in which straps extend around peripheral portions of segmental facing members and segmental heat absorbing bodies to hold the assembly together. The straps connect adjacent facing members in a manner such that there is a balanced reaction to forces exerted on said facing members. The straps also resist wear of the friction member and the torque keys in the area where the friction member is keyed to the rotating or nonrotating structure for transmitting torque thereto.

17 Claims, 8 Drawing Figures

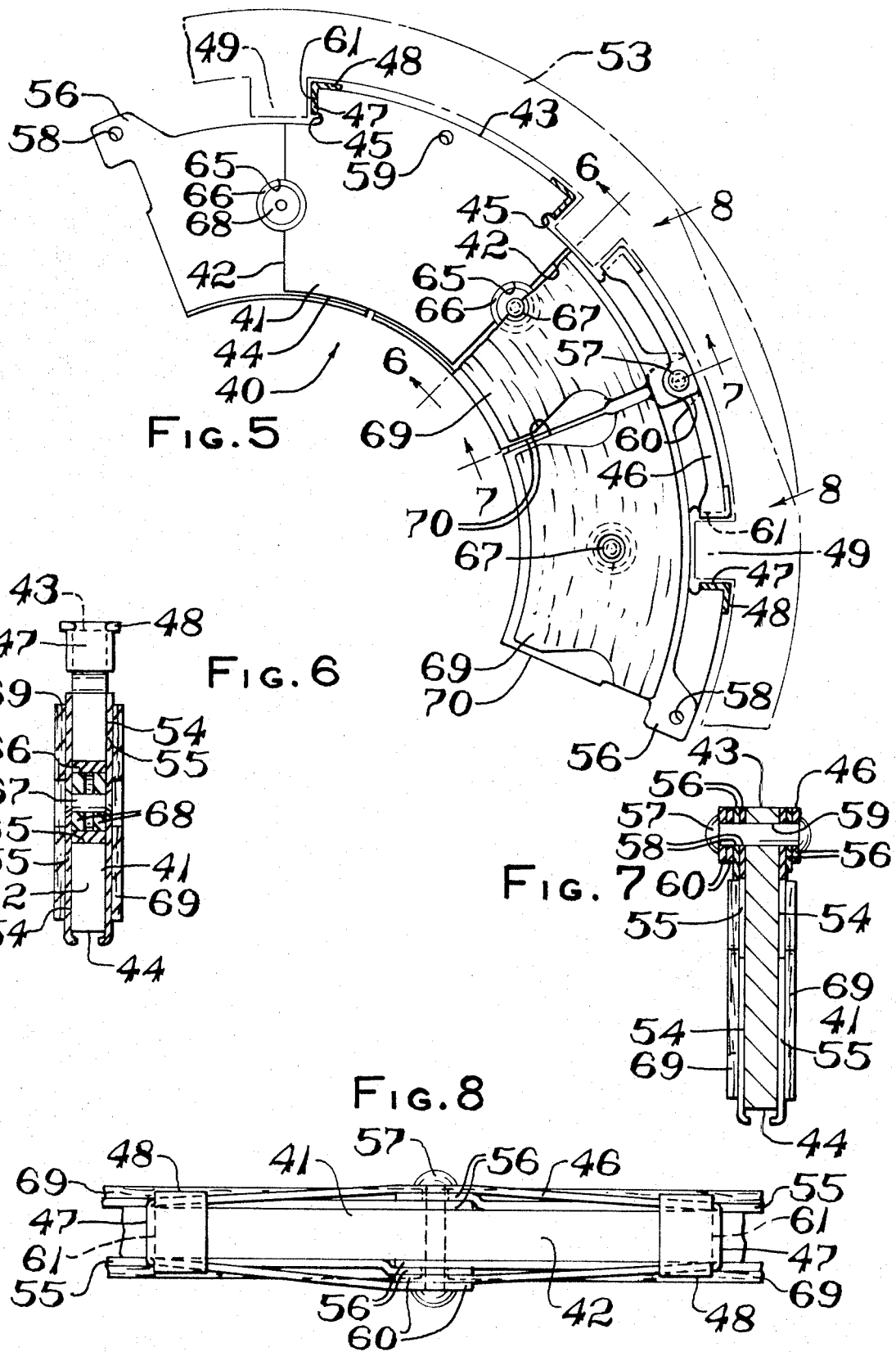

SEGMENTED FRICTION MEMBER ASSEMBLY FOR BRAKE OR CLUTCH

BACKGROUND OF THE INVENTION

This invention relates to disc type brakes or clutches and particularly to the annular friction disc members which engage other friction disc members during operation of the brake or clutch. These friction disc members may have a core of heat absorbing material which has been referred to as the "heat sink element" and be sandwiched between facing members of wear-resistant material. These facing members may carry a friction lining for engaging the friction lining of another disc member.

It has been found that when the core of heat absorbing material is a solid annular body, there may be problems with thermal warpage and cracking and accordingly the friction disc assemblies have been segmented to reduce the thermal stresses and eliminate the thermal fatigue cracks which have been especially prevalent in the friction disc rotor members of a brake or clutch. The use of segmented friction disc parts also reduces the cost of replacing parts which may be very expensive because of the cost of the materials used for the heat sink elements.

It will be evident that with a segmental friction disc member, the segments must be held together in a manner in which they will maintain their alignment and each segment must be supported to resist the various forces resulting from the frictional engagement of one disc member with an adjacent disc member and the transmission of the torque to a torque tube or to a wheel. It has been found that where the segments are fastened together in the heat-swept area where the greatest thermal expansion and shrinkage take place, forces are set up which exert undesirable stresses on the facing members and the segmental heat sink bodies between the facing members. This is especially true where holes must be drilled in the heat sink bodies interfering with the thermal flow and the thermal expansion of these bodies.

It has also been found that special guards or wear-resisting clips have been necessary to protect the heat sink bodies and the torque keys from undesirable wear causing early replacement of parts and detracting from the performance of the brake or clutch.

SUMMARY OF THE INVENTION

According to this invention, an annular segmental friction member is provided in which the facing members are held in position on the opposite faces of the heat sink bodies by strap members extending around the outer periphery of the heat sink bodies and over the facing members. With this construction, it is not necessary to have holes in the heat sink body, especially in the heat-swept area, and therefore uninterrupted thermal flow and freedom from thermal expansion may be obtained. Each of the facing members may have radially, outwardly extending lugs in engagement with the ends of the strap members so that the forces exerted by the lug of one facing member against the strap may be conveyed to the lug of an adjacent facing member through the strap member to balance the reactions to the forces in each facing member. This is especially true with respect to the forces tending to turn the facing members relative to the heat sink bodies. The segmental facing members have side edges which are offset from the side edges of the heat sink bodies providing an overlapping construction for holding the assembly together and keeping it in alignment.

Indentations at the peripheral corners of the segmental heat sink bodies have radially extending edges around which the strap members extend. These radially extending edges at opposite ends of the heat sink bodies have an undercut, converging relationship which is desirable for resisting radial movements of the strap members off of the heat sink bodies. Flanges on the ends of the straps overlie the peripheral edges of the heat sink bodies at the corners and also maintain the strap members in position.

Resistance to wear at the indentations is provided by the overlapping strap members at the ends which bear against the wheel drive keys and serve to reduce wear on the keys also.

The strap members may be detachably connected at a position spaced from the ends for ease of maintenance and replacement. In one modification, the ends may be fastened together by rivets which extend through the lugs of the facing members and the heat sink bodies at a position outside the heat-swept area.

The accompanying drawings show one preferred form and a modification made in accordance with and embodying this invention and which are representative of how this invention may be practiced.

BRIEF DESCRIPTION OF THE DRAWINGS

In the drawings:

FIG. 5 is an elevation of a part of an annular disc assembly (shown in solid lines) for a modified form of the invention, certain parts being broken away and illustrated in torque driving engagement with a related part which in this example may be a rotatable wheel, the sides of which are represented by the chain-dotted lines.

FIG. 6 is an enlarged, detailed sectional view of the disc assembly taken along the plane of line 6—6 of FIG. 5.

FIG. 7 is an enlarged, detailed view of the disc assembly taken along the plane of line 7—7 of FIG. 5.

FIG. 8 is an enlarged fragmentary, detailed view taken along the plane of line 8—8 of FIG. 5.

DETAILED DESCRIPTION

Figure 1:
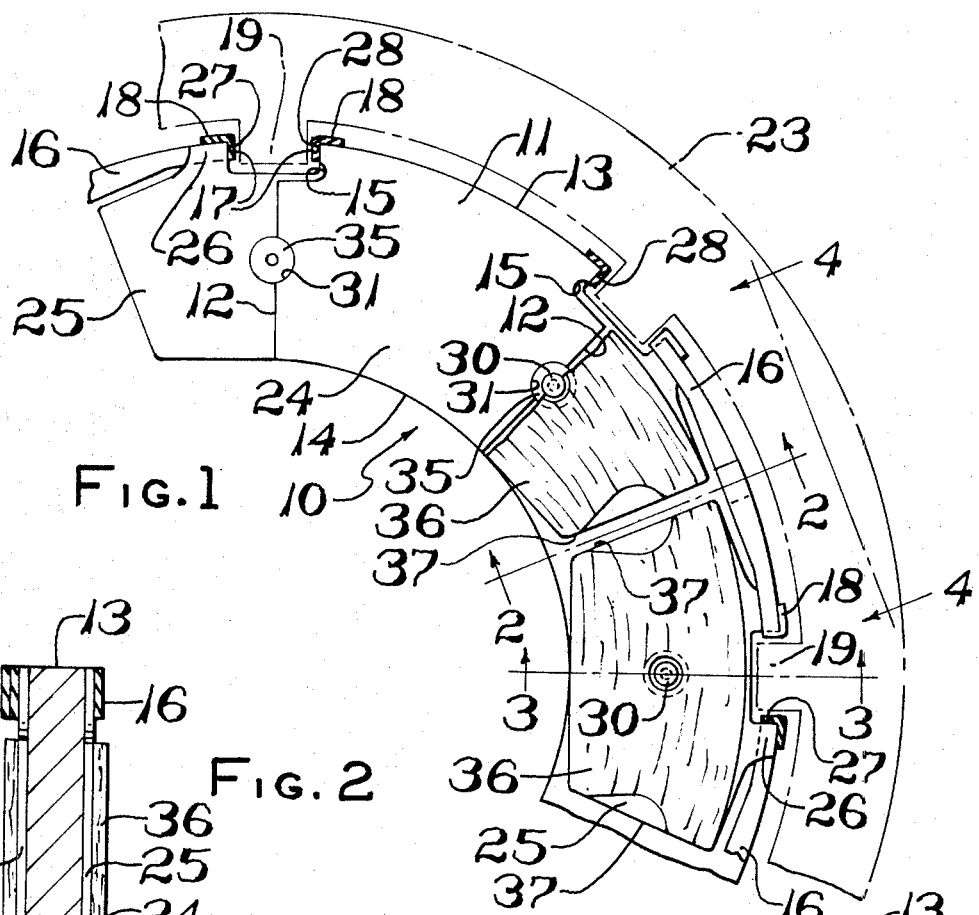
FIG. 1 is a side elevation of a part of an annular disc assembly (shown in solid lines), certain parts being broken away and illustrated in torque driving engagement with a related part which in this example may be a rotatable wheel, the sides of which are represented by the chain-dotted lines.
Figure 2:
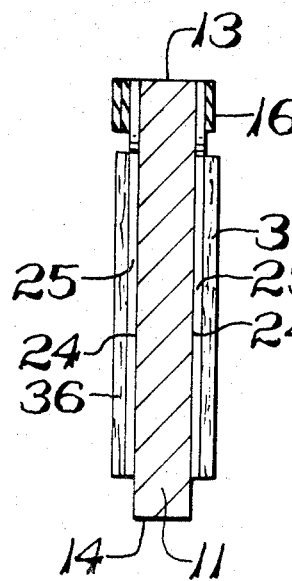
FIG. 2 is an enlarged, detailed sectional view of the disc assembly, taken along the plane of line 2—2 of FIG. 1.

Referring to FIG. 1, an annular, segmental friction member 10 is shown having a plurality of arcuate heat sink bodies 11 disposed in end-to-end relationship forming an annulus. The heat sink bodies 11 are preferably of a material having high heat absorbing properties such as beryllium.

Heat sink body side edges 12 of one of the heat sink bodies 11 are closely spaced to the heat sink body side edges 12 of adjacent heat sink bodies permitting room for thermal expansion and contraction. The heat sink bodies 11 have outer peripheral edges 13 and inner peripheral edges 14 with indentations 15 at the radially outer corners where the side edges 12 and outer peripheral edges 13 come together.

Figure 4:
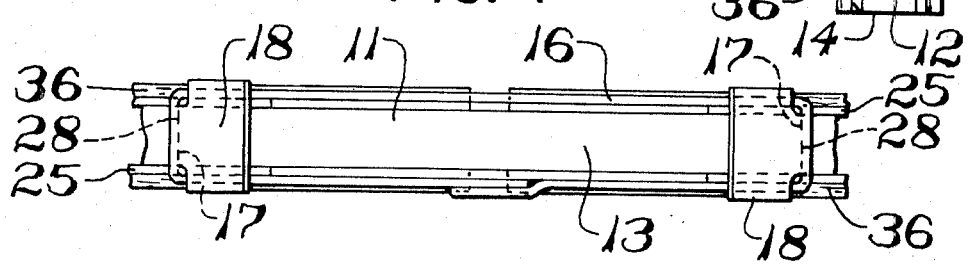
FIG. 4 is a fragmentary enlarged, detailed view taken along the plane of line 4—4 of FIG. 1.

Strap members 16, which may be of steel bands, extend circumferentially of the friction member 10 at the outer peripheral edges 13 of the heat sink bodies and around the indentations 15. Ends 17 of the strap members 16 are wrapped around the indentations 15 of the heat sink bodies 11 and have circumferentially extending flanges 18 shown more clearly in FIG. 4 for overlapping the outer peripheral edges 13 of the heat sink bodies 11 to hold the strap members in position. The ends 17 of the strap members and the flanges 18 also provide a wear-resistant surface for engagement with driving lugs or splines 19 of a rotating part such as wheel 23.

The arcuate heat sink bodies 11 have radially extending faces 24 which are covered on opposite sides by a series of facing members 25. Each of the facing members 25 has a pair of radially, outwardly extending lugs 26 which are spaced apart a distance equal to approximately the width of the splines 19 for embracing the splines in driving relationship. The strap members 16 are wrapped around the lugs 26 and hold the facing members 25 against the faces 24 of the heat sink bodies 11.

Radially extending edges 27 of the lugs 26 and radially extending edges 28 at the indentations 15 of the heat sink bodies 11 around which the ends 17 of the strap members 16 are wrapped are undercut and extend towards the center of the friction member 10 on a converging path providing resistance to radially outward movement of the strap members during operation. This may be accomplished by making these edges 27 and 28 radial or by increasing the angle so that extensions of the edges would converge short of the center of the friction member 10.

Figure 3:
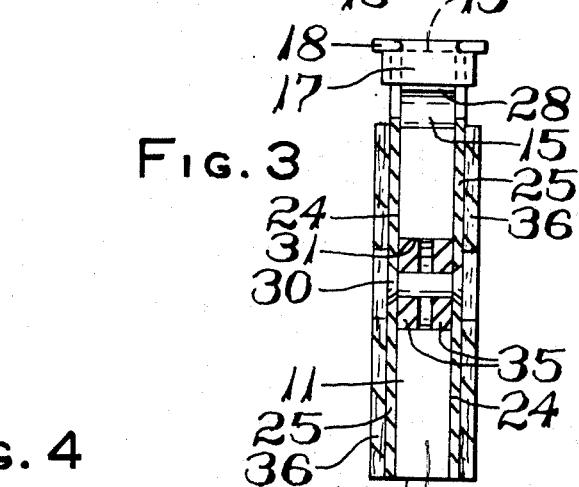
FIG. 3 is an enlarged sectional view of the disc assembly taken along the plane of line 3—3 of FIG. 1.

As shown in FIGS. 1 and 3, additional fasteners such as rivets 30 may extend through the facing members 25 at positions radially inward of the strap members 16 for holding the facing members against the faces 24 of the heat sink bodies 11. Preferably, the rivets 30 are located in positions where they do not pass through the heat sink bodies 11 but pass between them at the side edges 12. Recesses 31 in the side edges 12 may be provided for receiving torque buttons 35 which may be resistance-welded to the facing members 25 and through which the rivets 30 extend.

The facing members 25 may be of steel or other wear-resistant material and, as shown in this embodiment, carry friction linings 36 which may be of material of the type described and set forth in United States Pat. No. 2,966,737 of R. E. Spokes et al. The friction linings 36 cover arcuate areas of the facing members 25 which are engageable with opposing faces of associated brake or clutch structures upon axial movement of the friction member 10 relative to the other brake parts not shown. In the embodiment shown, the friction member is a rotor and rotates with the wheel and therefore would move axially into engagement with a stator mounted on a torque tube which may be attached to a wheel supporting structure.

As shown in FIG. 1, the facing members 25 have radially extending side edges 37 which are arcuately offset from the side edges 12 of the heat sink bodies 11, providing an overlapping of the heat sink bodies by the facing members with the assembly being held together by the strap members 16 which are located outwardly of the heat-swept area of the friction member 10 and therefore are not subject to the thermal expansion and contraction found in the areas covered by the friction linings 36. The strap members 16 have overlapping end portions 38 which may be detachably connected at the side as by welding or spot riveting so that assembly and disassembly may be accomplished with a minimum of time and labor.

During operation of the friction member, the friction linings 36 are moved axially into engagement with opposing faces of stators generating heat and exerting turning forces on the facing members 25 about the torque buttons 35 which is resisted by the lugs 26 exerting forces on the strap members 16 at one end. These forces are reacted by the lugs 26 on the strap members 16 and in turn on splines 19. In this manner, the turning forces of the facing members 25 are totally reacted providing a balanced construction. The main force due to torque is transmitted from the facing members 25 to the heat sink bodies 11 through the torque buttons 35 and then to the splines 19. The torque buttons 35 also prevent relative movement between adjacent heat sink bodies 11.

Referring to FIGS. 5, 6, 7 and 8, a modification of the invention is shown in which an annular friction member 40 has a plurality of segmental, arcuate, heat sink bodies 41 disposed in end-to-end relationship forming an annulus. Each of the heat sink bodies 41 has radially extending side edges 42 at the ends which are spaced from the radially extending side edges of adjacent heat sink bodies. The heat sink bodies 41 also have outer peripheral edges 43 and inner peripheral edges 44 which are curved to conform with the curvature of the annulus.

At the outer corners where the side edges 42 and outer peripheral edges 43 would intersect, the heat sink bodies 41 have indentations 45 around which strap members 46 are wrapped and extend circumferentially between the indentations and over the outer peripheral portions of the heat sink bodies. Each of the strap members 46 has ends 47 wrapped around the heat sink bodies 41 at the indentations 45 and also circumferentially extending lips or flanges 48 overlapping the outer peripheral edge 43 at the corners of the indentations 45. These strap ends 47 and flanges 48 are positioned for engagement with splines 49 of a wheel 53 for transmitting torque and providing resistance to wear at this area since the strap members 46 are preferably of steel or other wearresistant material.

The heat sink bodies 41 have radially extending faces 54 covered by a series of facing members 55 which are also arcuate segments disposed in end-to-end relationship around the friction member 40 forming an annulus on each side of the heat sink bodies 41. Each of the facing members 55 has a pair of circumferentially, spaced-apart lugs 56 extending radially outwardly from the facing members and underlying the strap members 46 at positions approximately midway between the ends 47 of the strap members. Fasteners such as rivets 57 extend through holes 58 in the lugs and through holes 59 in the heat sink bodies 41 for clamping the lugs 56 of adjacent facing members together and also fastening end portions 60 of the strap members 46. The rivets 57 tend to hold the strap members 46 in position as do the radially extending edges 61 of the indentations 45. These edges 61 are undercut and converge towards the center of the annular friction member 40 providing an undercut edge at each of the ends 47 of the strap members 46 resisting radially outward movement of the ends at these positions. The flanges 48 also limit the radially inward movement of the strap members 46 and therefore provide a stable structure.

The side edges 42 of the heat sink bodies 41 may have recesses 65 for receiving sleeves 66 and torque buttons 68 which may be resistance-welded to the inner faces of facing members 55. Rivets 67 extend through the torque buttons 68 for holding the facing members 55 together at a position radially inward from the strap members 46. The rivets 67 pass through the facing members 55 but pass between the side edges 42 of the heat sink body 41 in the recesses 65 to reduce any thermal stresses caused by holes in the heat sink bodies and providing better thermal flow of the heat in the heat sink bodies 41.

The friction member 40, which in this case is a rotor, is movable axially along the splines 49 into engagement with the radially extending faces of other associated brake or clutch parts, as for instance, a stator, and a friction lining 69 may be adherred to the facing members 55 for providing the desired resistance to turning.

As shown in FIG. 5, each of the facing members 55 has radially extending side edges 70 at the ends of each arcuate segment which are spaced from the side edges of the adjacent facing members. The facing members 55 are in overlapping relationship with the heat sink bodies 41 and the side edges 42 of the heat sink bodies are circumferentially spaced and offset from the side edges 70 of the facing members.

In operation, the frictional forces tending to turn the facing members 55 are totally reacted through the rivets 57 connecting the lugs 56 of adjacent facing members and the forces are transmitted from the facing members to the splines 49 through the heat sink bodies 41 and strap members 46 in a manner which places stress on the portions of the heat sink bodies radially outward of the heat-swept area in the location of the friction linings 69. The rivets 67 in this area provide for holding the facing members together and the main force due to torque is transmitted from the facing members 55 to the heat sink bodies 41 through the torque buttons 68 and then to the splines 49.

We claim:

1. An annular segmental friction member of a brake or clutch mechanism comprising a plurality of arcuate heat sink bodies of heat absorbing material in end-to-end adjacent relationship, said heat sink bodies having radially extending faces for moving toward and away from opposing faces of an associated brake or clutch structure, facing members overlying said radially extending faces for engagement with said opposing faces for transmitting torque and continuous girdling strap members holding said facing members on said heat sink bodies, each of said strap members extending circumferentially of said friction member and completely around one of said heat sink bodies and over one of said facing members whereby the facing members are held between the girdling strap member and the heat sink body.

2. An annular segmental friction member according to claim 1 wherein said strap members are located at the outer peripheral edges of said heat sink bodies and radially outward of the heat-swept area of said friction member.

3. An annular friction member according to claim 2 wherein said facing members have radially outwardly extending lugs disposed between said strap members and said heat sink bodies whereby said facing members are held against said heat sink bodies.

4. An annular friction member according to claim 2 wherein said heat sink bodies have indentations at the radially outer corners for receiving radially inward extending members of an associated brake or clutch structure for transmitting torque and said strap members extend around said indentations for protecting said heat sink bodies and said facing members from wearing forces.

5. An annular friction member according to claim 4 wherein said facing members have radially, outwardly extending lugs disposed between said heat sink bodies and said strap members at said indentations whereby forces tending to rotate said facing members are resisted by said lugs engaging said radially inward extending members.

6. An annular friction member according to claim 4 wherein said indentations have radially extending edges over which said strap members extend and said edges converge toward the center of said friction member whereby the strap member extending around said edges is retained against radial movement.

7. An annular friction member according to claim 6 wherein said facing members have radially, outwardly extending lugs extending between said heat sink bodies and said strap members at said indentations and the edges of said lugs have the same slope as said radially extending edges of said indentations for retaining said strap members on said heat sink bodies and said facing members.

8. A friction member for a brake or clutch comprising heat sink bodies, each with two side edges, an outer peripheral edge, an inner peripheral edge, and radially extending faces for moving toward or away from opposing faces of an associated brake or clutch structure, said heat sink bodies being assembled with their side edges in end-to-end adjacent relationship to form an annulus, a series of wear-resisting, segmental facing members arranged with adjacent side edges to define an annulus overlying said radially extending faces of said annular assembly of heat sink bodies to cover said radially extending faces and frictionally engage said opposing faces of said associated brake or clutch structure, the side edges of said facing members in said series being circumferentially offset from the corresponding, underlying side edges of the heat sink bodies so that each facing member overlaps the adjoining side edges of two underlying heat sink bodies, strap members extending circumferentially of said friction member, over said facing members and around said heat sink bodies, each of said strap members overlying two of said facing members and one of said heat sink bodies for holding said friction members together.

9. A friction member according to claim 8 wherein each of said strap members is located at said outer peripheral edge of each of said heat sink bodies and said facing members have radially, outwardly extending lugs held between said strap members and said heat sink bodies.

10. A friction member according to claim 9 wherein said lugs of each of said facing members are at circumferentially spaced-apart positions and one of said lugs extends between one of said strap members and one of said heat sink bodies and another of said lugs extends between an adjacent heat sink body and another of said strap members.

11. A friction member according to claim 10 wherein said facing members overlie said radially extending faces on both sides of said heat sink bodies and fastening means extend between the facing members on opposite sides of each of said heat sink bodies, said fastening means being located between the adjoining side edges of adjacent heat sink bodies.

12. A friction member according to claim 11 wherein each of said heat sink bodies has recesses in the side edges, torque buttons mounted on said facing members and disposed in said recesses for transmitting the main force due to torque from the facing members to said heat sink bodies and restricting relative movement between adjacent heat sink bodies.

13. An annular segmental friction member of a brake or clutch mechanism comprising a plurality of arcuate heat sink bodies of heat absorbing material in end-to-end adjacent relationship, said heat sink bodies having radially extending faces for moving toward and away from opposing faces of an associated brake or clutch structure, facing members overlying said radially extending faces for engagement with said opposing faces for transmitting torque, strap members located at the outer peripheral edges of said heat sink bodies and radially outward of the heat-swept area of said friction member for holding said facing members on said heat sink bodies, each of said strap members extending circumferentially of said friction member around one of said heat sink bodies and each of said facing members having a pair of radially outwardly extending lugs at circumferentially spaced-apart positions, one of said pair of lugs extending between one of said strap members and one of said heat sink bodies whereby said facing members are held against said heat sink bodies.

14. An annular segmental friction member of a brake or clutch mechanism comprising a plurality of arcuate heat sink bodies of heat absorbing material in end-to-end adjacent relationship, said heat sink bodies having radially extending faces for moving toward and away from opposing faces of an associated brake or clutch structure, facing members overlying said radially extending faces for engagement with said opposing faces for transmitting torque and strap members holding said facing members on said heat sink bodies, said strap members being located at the outer peripheral edges of said heat sink bodies and radially outward of the heat-swept area of said friction member and having circumferentially extending flanges at the ends for overlapping said heat sink bodies and said facing members to resist wear and position said strap member on said outer peripheral edges of said heat sink body, each of said strap members extending circumferentially of said friction member around one of said heat sink bodies and over one of said facing members whereby the facing members are held between the strap member and the heat sink body.

15. An annular friction member according to claim 14 wherein said strap members are detachably connected at a position spaced from the ends of said heat sink bodies where said strap members wrap around the radially extending edges of said heat sink bodies.

16. An annular segmental friction member of a brake or clutch mechanism comprising a plurality of arcuate heat sink bodies of heat absorbing material in end-to-end adjacent relationship, said heat sink bodies having radially extending faces for moving toward and away from opposing faces of an associated brake or clutch structure, facing members overlying said radially extending faces for engagement with said opposing faces for transmitting torque and strap members holding said facing members on said heat sink bodies, said strap members being located at the outer peripheral edges of said heat sink bodies and radially outward of the heat-swept area of said friction member and at a position spaced from the ends of said heat sink bodies where said strap members wrap around the radially extending edges of said heat sink bodies, said strap members being detachably connected to said heat sink bodies by fasteners extending through said strap members and said heat sink bodies and each of said strap members extending circumferentially of said friction member around one of said heat sink bodies and over one of said facing members whereby the facing members are held between the strap member and the heat sink body.

17. An annular friction member according to claim 16 wherein said facing members have radially, outwardly extending lugs disposed between said strap members and said heat sink bodies at said positions spaced from the ends of said heat sink bodies and said fasteners extend through said lugs.

* * * * *